United States Patent
Wang

[19]

[11] Patent Number: 6,054,154
[45] Date of Patent: Apr. 25, 2000

[54] METHOD FOR COATING A WHOLE MEAT MUSCLE PRODUCT WITH A POWDERED MIXTURE

[75] Inventor: Pie-Yi Wang, Wheaton, Ill.

[73] Assignee: Swift-Eckrich, Inc., Downers Grove, Ill.

[21] Appl. No.: 08/935,442

[22] Filed: Sep. 23, 1997

[51] Int. Cl.[7] .............................. A23B 4/00; A23B 4/044; A23L 3/00
[52] U.S. Cl. ........................... 426/92; 426/235; 426/236; 426/314; 426/315; 426/246
[58] Field of Search ................................... 426/264, 272, 426/315, 289, 294, 314, 246, 235, 236, 92

[56] References Cited

U.S. PATENT DOCUMENTS

| 1,483,668 | 2/1924 | Little . |
| 1,719,354 | 7/1929 | Alsop . |
| 2,565,454 | 8/1951 | MacKenzie et al. ...................... 99/261 |
| 2,758,535 | 8/1956 | Roberts ..................................... 99/261 |
| 2,789,914 | 4/1957 | Davis ....................................... 99/229 |
| 2,844,478 | 7/1958 | Hanley et al. ........................... 99/229 |
| 3,203,809 | 8/1965 | Visness et al. ........................... 99/229 |
| 3,457,080 | 7/1969 | Watkins . |
| 3,615,728 | 10/1971 | Waserman ............................... 99/229 |
| 4,072,762 | 2/1978 | Rhodes ................................... 426/510 |
| 4,196,220 | 4/1980 | Chiu et al. .............................. 426/105 |
| 4,208,438 | 6/1980 | Saurenman .............................. 426/235 |
| 4,271,208 | 6/1981 | Itoh et al. ................................ 427/28 |
| 4,296,142 | 10/1981 | Vasudevan et al. ...................... 427/28 |
| 4,367,242 | 1/1983 | Jarvis et al. ............................. 426/293 |
| 4,372,981 | 2/1983 | Lieberman .............................. 426/235 |
| 4,510,170 | 4/1985 | Cosentino et al. ........................ 427/33 |
| 4,702,932 | 10/1987 | Cosentino et al. ........................ 427/33 |
| 4,957,756 | 9/1990 | Olander et al. ......................... 426/243 |
| 4,971,818 | 11/1990 | Pye ......................................... 426/237 |
| 5,039,537 | 8/1991 | Underwood ............................. 426/271 |
| 5,135,770 | 8/1992 | Underwood ............................. 426/650 |
| 5,287,801 | 2/1994 | Clark ........................................ 99/451 |
| 5,292,541 | 3/1994 | Underwood et al. ................... 426/250 |
| 5,353,994 | 10/1994 | Clark ....................................... 239/700 |
| 5,385,086 | 1/1995 | Burns et al. ............................. 99/451 |
| 5,601,864 | 2/1997 | Mitchell ................................. 426/643 |

FOREIGN PATENT DOCUMENTS

| 0 274 163 | 7/1988 | European Pat. Off. . |
| 2 325 900 | 12/1974 | Germany . |
| 6704699 | 9/1968 | Netherlands . |
| 2 000 430 | 1/1977 | United Kingdom . |

*Primary Examiner*—David Lacey
*Assistant Examiner*—Drew Becker
*Attorney, Agent, or Firm*—Pretty, Schroeder & Poplawski

[57] ABSTRACT

Disclosed is a method for applying a powder blend to a whole meat muscle product and the product so produced. A cooked, whole meat muscle product is placed on an electrically grounded support in a coating chamber to expose a surface of the whole meat muscle product to be coated. A powder blend containing a food grade powder, that is at least partially cold water soluble, and a powdered moisture absorbent agent is then introduced into the coating chamber and an electrostatic charge applied to the powder blend to cause the powder blend to be attracted to and form a coating on the exposed surface to the whole meat muscle product.

21 Claims, 1 Drawing Sheet

METHOD FOR COATING A WHOLE MEAT MUSCLE PRODUCT WITH A POWDERED MIXTURE

BACKGROUND OF THE INVENTION

1. Field of the Invention

This invention relates to a method for preparing food products and the products so produced. In particular, it relates to a method for coating a whole meat muscle product with a powdered material and the thus produced coated whole meat muscle product.

2. Description of the Related Art

The addition of smoke flavor and/or color to meat products has been very popular for hundreds, if not thousands, of years across the world. A number of methods for producing smoke-flavored and/or smoke-colored products are known. These methods include adding smoke flavor and/or color to meat products using natural smoke or using liquid smoke.

Natural smoke is produced by the thermal decomposition of woods. Once generated, the smoke is introduced into a processing oven or smokehouse containing the meat product to be treated. Inside the smokehouse, a blower circulates the smoke around the meat product and causes the smoke to be deposited on the surface of the meat. There are numerous drawbacks to using natural smoke. For example, the accumulation of tar during the natural smoke processes makes it difficult to preserve a consistent smoke quality as well as to maintain equipment in good working order. Furthermore, natural smoke processes emit effluent requiring expensive air pollution control systems.

An alternative to natural smoke is liquid smoke. Liquid smoke is generally produced by condensing natural smoke or by water scrubbing natural smoke. Liquid smoke application processes typically involve dipping, spraying, or drenching the meat product to be treated in or with a solution containing liquid smoke.

It is known that an electrostatic field can be applied to cause natural smoke or atomized liquid smoke to be attracted to a meat product and thus treat the meat product. While such arrangements allow for a more rapid distribution of smoke flavor and coloring over the meat product, such processes still suffer from serious drawbacks, especially if the meat product is wet. If the meat product has excessive moisture when it is smoked, its surface develops an undesirable muddy color and a bitter taste. This is of particular concern with whole meat muscle products such as turkey breasts, chicken breasts, ham products and the like. They are generally wet, having been treated with a pickling solution prior to smoking.

GB 2,000,430 A discloses a method for producing smoked fish. A combination of a smoke flavor salt-based composition and maltodextrin, a water-soluble carrier, can be applied with an electrostatic spray gun. The fish is not pickled prior to smoking. Instead, the method described in GB 2,000,430 A serves as an alternative to pickling.

Thus, there remains a definite need for an effective method for a consistent, quick, and cost effective coating method for coating whole meat products with a powdered material. There remains a further definite need for a method for applying powdered materials, that are at least partially water-soluble, to whole meat muscle products that have been injected with a pickling solution. There remains a still further definite need for a method for evenly distributing flavoring and/or coloring coatings to whole meat muscle products. The present invention satisfies these and other needs and provides further related advantages.

SUMMARY OF THE INVENTION

The present invention, which addresses the above needs, is embodied in a method for uniformly and consistently coating a powder blend, that is at least partially cold water-soluble, such as a blend containing a smoke powder, on a whole meat muscle product, and in particular, on a chilled, wet, whole meat muscle product. The blend also contains a water absorption agent, such as gelatin, carrageenan, or starch, in a ratio of powder to moisture absorption agent of from about 1 to 20 to about 20 to 1, based on the weight of the blend.

In some preferred embodiments, the whole meat muscle product is a turkey, chicken, or ham whole muscle product that has been treated with water or a pickling solution. Still further in some embodiments, prior to coating, the pickled whole meat muscle product is cooked to an internal temperature of at least about 150° F. and then chilled to an internal product temperature of at least about 40° F. The powder blend is applied by placing the chilled whole meat muscle product on an electrically grounded support in a coating chamber to expose a wet surface of the whole meat muscle product to be coated. The powdered blend is then introduced into the coating chamber and an electrostatic charge applied to the blend, to cause the blend to be attracted to and form a coating on the exposed surface of the whole meat muscle product. Finally, in some embodiments, the thus coated whole meat muscle product is cured to develop the desired color and/or flavor.

Other features and advantages of the present invention will become apparent from the following detailed description, taken in conjunction with the accompanying drawing, which illustrates, by way of example, the principles of the invention.

DETAILED DESCRIPTION OF THE PREFERRED EMBODIMENTS

Figure 1:
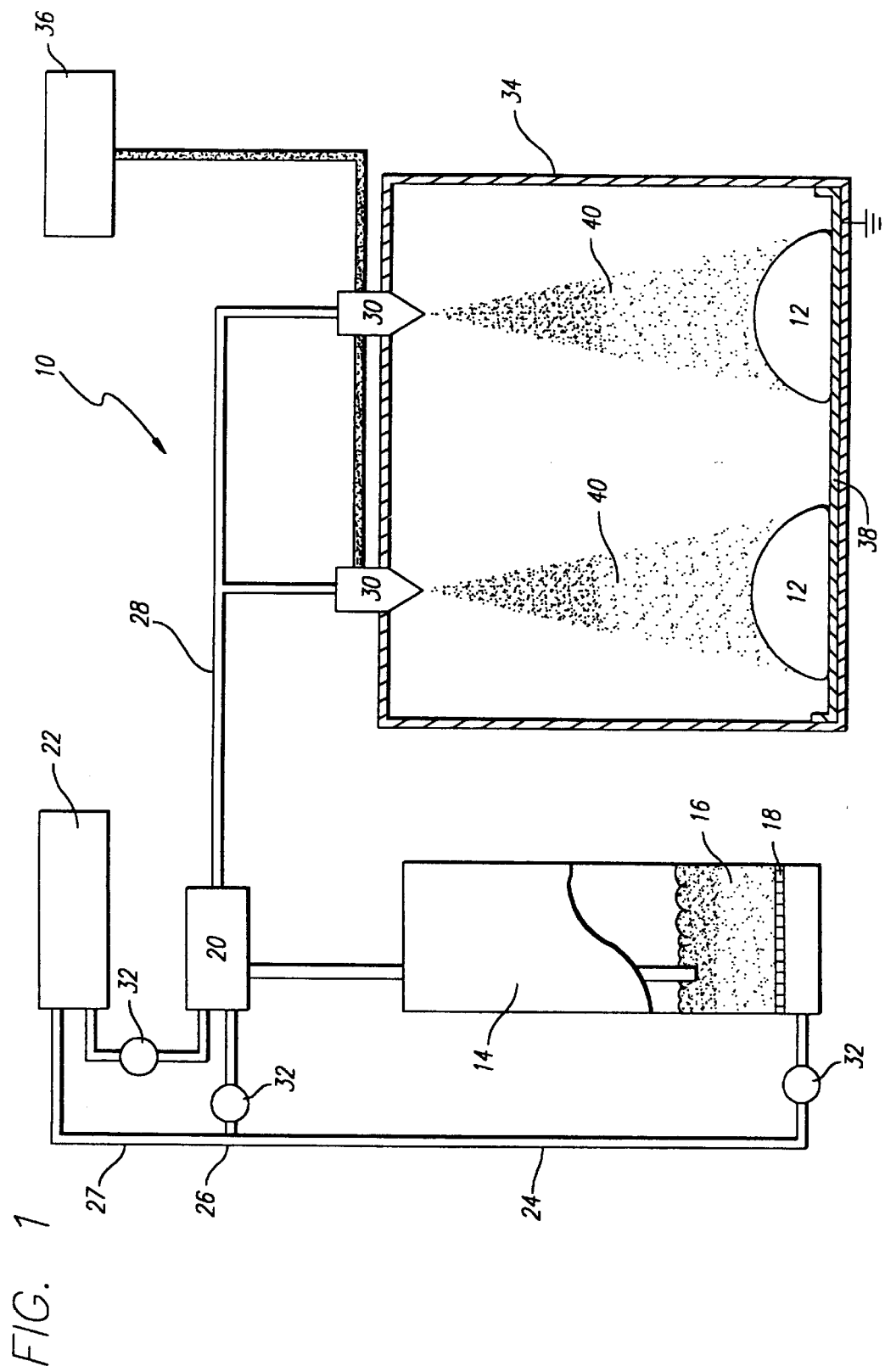
FIG. 1 shows a partially cut-away side view of an apparatus, including a coating chamber and related equipment, for coating a whole meat muscle product in accordance with the invention.

With reference to the FIG. 1, there is shown an apparatus 10 for coating a whole meat muscle product 12 in accordance with the inventive method. The apparatus includes a feed hopper 14 containing a blend of coating powder materials 16. The feed hopper is provided with a fluidizing plate 18 to ensure that the coating powder materials can be maintained in a flowable condition. A venturi-type, powder feed pump 20 is operationally connected at the top of the feed hopper. An air pump 22 supplies fluidizing air to the hopper through a fluidizing air pipe 24. Another air pipe 26, leading from the fluidizing air pipe 24, provides a flow of air to the venturi-type pump. Still further, the air pump provides atomizing air to the powder feed pump through the an atomizing air pipe 27. The atomizing air increases the velocity of the powder materials as they are transported from the power feed pump, through feed tubing 28, and then discharged from a series of electrostatic spray guns 30. The air pressure is controlled by a series of air pressure regulators 32.

The spray guns 30 are integrally housed in and insulated from a coating chamber 34. The electrostatic spray guns are operationally connected to a power control unit 36 for producing an electrostatic field. The spray guns are longitudinally spaced along the length of the top of (or the side of) the coating chamber. Positioned on the bottom of the coating chamber is an electrically grounded removable tray 38 allowing for the placement of the whole meat muscle product 12 in the path of the powder spray 40 ejected from the spray nozzles.

Any whole meat muscle product can be advantageously coated in accordance with the invention. Representative whole meat muscle products include turkey breast, chicken breast, ham products, and the like. In preferred embodiments, the whole meat muscle product is treated with water or a pickling solution, cooked, and then chilled before coating. Also in some preferred embodiments, the whole meat muscle product is preformed to a desired geometric shape and size.

Typical pickling solutions contain water, salt, cure mix, binders, and flavoring ingredients. The whole meat muscle product is injected with the pickling solution, then tumbled or massaged to facilitate protein extraction and diffusion of the pickling solution throughout the meat product. A vacuum is usually applied during the tumbling or massaging processes to enhance product cohesion and over-all quality.

The thus treated whole meat muscle product is often placed in a cook-in-bag or mold to form a defined shape and size. Shaping in a cook-in-bag can be accomplished by means of a form-fill-seal machine. This machine requires two types of film, a forming film and a non-forming film. The forming film is preheated and moves forward to a shaping cavity where the desired shape and size is formed by vacuum suction, forming plug, or both simultaneously. The shaping cavity is indexed to the stuffing station. The tumbled or massaged meat product is portioned and automatically stuffed into the cavity. After the stuffing, the non-forming film is brought in place over the cavity containing the meat product as the package moves to a final seal station. At the seal station, air is evacuated from the cavity at vacuum level higher than 27 in. The forming film and non-forming film are hermetically sealed together by a heat-seal bar that melts the two film sealant layers and welds them together under pressure.

The cook-in-bag containing the pickled whole meat muscle product is then moved to an oven or smokehouse to be cooked to an internal temperature, typically, of 150° F. or higher. The product, after cooking, is chilled to an internal product temperature, typically, of 40° C. or lower. The cook-in-bag is then peeled from the product.

The resulting pickled and formed whole meat muscle product is then coated with a blend of powdered coating materials, including a food grade powder, that is at least partially water soluble, such as smoke powder or caramel coloring powder, and a powdered moisture absorption agent. The blend can contain other powdered materials such as additional flavorings, colorants, and the like.

Suitable smoke powders include Chardex Hickory™ smoke powder from Red Arrow Co., a spray-dried natural smoke flavoring produced by combining a maltodextrin carrier with an aqueous hickory smoke solution. The smoke powder is hygroscopic and contains hydrated silicon as an anti-caking agent. According to the manufacturer, Chardex Hickory™ smoke powder has the following chemical properties:

Moisture: 6~8.5%
Total Acidity: 6~8.5%
Smoke Flavor Compound: 15~20 mg/g
Bulk Density: 0.5 g/cc The smoke powder possesses light to medium golden brown color and passes through a 40 mesh screen.

The food grade powders of use with the inventive process are at least partially water soluble, generally, are highly water soluble, even at temperatures of about 40° F. or less. If a conventional water-soluble powder is applied to a wet product surface, the powder dissolves and forms an aqueous solution which tends to run down the product surface causing unwanted streaking of the coating.

To avoid such cohesion problems, the powder is combined with a powdered moisture absorption agent—a powder which does not dissolve in water at low temperatures while possessing water absorption capabilities. Suitable moisture absorption agents include gelatin, carrageenan, and starch. Gelatin is the preferred moisture absorption agent. When gelatin coats on a cold, wet product surface, the gelatin swells, forming hydrated particles that lock the free moisture on the surface. The resulting dry surface prevents the flavoring or coloring from diffusing into internal parts of the products causing color distortion, while shortening drying times. The wet products coated with the mixture of smoke and gelatin powders do not suffer from surface uniformity problems and remain free of streaks throughout their processing.

The relative amounts of food grade powder and moisture absorption agent to be used in a particular application depend on the particular combination of powder and moisture absorption agent chosen, as well as the whole meat muscle product to be treated and how the whole meat muscle product has been pickled or otherwise pretreated. The ratio of powder to moisture absorption agent to be used in a particular application will be readily determinable by one skilled in the art without undue experimentation. Sufficient moisture absorbent agent is added to the blend to dry the surface of the whole meat muscle product. The ratio typically falls in the range of from about 1:20 to about 20:1, preferably from about 2:1 to about 20:1, and more preferably from about 2:1 to about 4:1, based on the weight of the blend. If too little moisture absorption agent is employed, a uniform coating will not be formed. There is no advantage to using too much moisture absorption agent and it could negatively impact on the flavor and color of the coated meat product.

The particle sizes of the powders forming the blend are generally less than about 70 microns and, preferably from about 1 to about 40 microns.

In accordance with the present invention, the blend of coating powder material 16 is loaded in the feed hopper 14. The hopper has the fluidizing plate 18 positioned at its bottom and, connected at its top, the venturi-type pump 20, with adjustable flow rate and an atomizing air nozzle (not shown). The powder material is fluidized in the hopper with the aid of the stream of fluidizing air provided from the air pump 22 through the fluidizing air pipe 24 and into the bottom of the feed hopper. The flow rate of the fluidizing air is typically from about 10 psi to 60 psi and preferably from about 15 psi to about 30 psi. The flow rate within the powder feed pump is controlled by the supply of air from the air pump through the air pipe 26 into the powder feed pump.

The powder feed pump 20 transfers the blend of coating powder material through the feed tubing 28 to the series of electrostatic spray guns 30 housed in and electrically insulated by the coating chamber 34. The flow of material through the feed tubing is enhanced by atomizing air, also from the air pump 22 and provided through the atomizing air pipe 37. The atomizing air dilutes the powder, while breaking up any lumps that may be present in the power and increasing the velocity of the powder as it is ejected from the spray guns. The flow rate of both the fluidizing air and the atomizing air is typically from about 10 psi to about 60 psi, preferably from about 15 psi to about 30 psi. The flow rate of the atomized blend as it is ejected from the spray guns is typically from about one to about five pounds per hour per gun, preferably from about two to about three pounds per hour per gun.

The pickled, cooked, and chilled whole meat muscle product 12 is supported on the tray 38 positioned below the spray guns 30 exposing the surfaces to be coated. To minimize any possibility of microbial growth during the coating process, the whole meat muscle product is maintained at a temperature of 40° F. or less. The powder blend then evenly coats the cold, wet, bare surfaces of the whole meat muscle product 12. The whole meat muscle product picks up from about 0.05 to about 2.0, preferably from about 0.1 to about 0.2, weight percent, coating materials, based on the weight of the coated product.

To enhance the efficiency and uniformity of the blend of coating powder material 16, the powder is charged with high voltage electricity by means of a power control unit 36 which applies a low dc voltage power to a voltage multiplier known in the art (not shown) on each of the spray guns 30. The voltage supplied by the control unit is generally up to about 120 kilovolts, preferably from about 40 to about 100 kilovolts. The multiplier then produces a high voltage corona discharge which results in an electrostatic field across the internal portion of each spray gun. The powder accepts the electrostatic charge within each spray gun.

The coating chamber houses an electrically-grounded, removable tray 38, or in an alternative embodiment, an electrically-grounded, conveyer belt (not shown). The electrostatic attraction between powder and the whole meat muscle product forms a thin and uniform coating of the blend of coating material. Since the coating process occurs within an electrostatic field, the powder escaping from the electric field is minimal, thus eliminating the air pollution problems which are associated with natural or liquid smoke applications.

After coating, product treated with a smoke powder is cured by drying and heat-treating, for example, in an impingement oven or a smoke house, to induce a chemical reaction between the smoke powder and the meat product, thus forming the desired smoke color and flavor. The curing temperature is typically in the range of from about 120° to about 600° F. and the curing time from about 4 minutes to about 4 hours. The optimum conditions vary depending on the size of the whole meat muscle product and the equipment used.

From the foregoing, it will be appreciated that the invention allows for a continuous and uniform coating layer on whole meat muscle products subject to it.

Further, the coating process requires less time than conventional methods while at the same time reducing air pollution, thus it is both economically and environmentally sound for companies to use.

The following examples are included to further illustrate the invention. They are not limitations thereon.

EXAMPLE 1

Eight pounds of Chardex Hickory™ smoke powder is blended with two pounds of gelatin powder in a spice blender for five minutes to assure uniformity. The blended powder is then loaded into a feed hopper. The operation parameters of the electrostatic coating apparatus are set as follows:

Fluidizing Air: 20 psi
Atomizing Air: 15 psi
Flow Rate Air: 15 psi
Electrostatic Voltage: 100 kilovolts The packaging film of pickled, cooked, and chilled turkey breasts is peeled off. The bare, chilled turkey breasts are placed on a removable tray, inserted into a coating chamber and coated with the blended smoke and gelatin powders. The average powder amount of powder picked up by turkey breast is 0.13% of product's weight.

The resulting coated turkey breasts are placed on a conveyor and processed through an impingement oven set at 345° F. for approximately 6 minutes. After curing, the turkey products show an excellent golden brown smoke color. The products are then a 28° F. cooler and vacuum packed.

EXAMPLE 2

Pickled, cooked, and chilled turkey breasts are coated with a blend of smoke powder and gelatin, as described in Example 1.

The coated turkey breasts are then placed on racks and cured in a batch type smokehouse, with the parameters of the batch type smokehouse set as follows:

| Cycle | Dry Bulb (° F.) | Wet Bulb (° F.) | Time Min. |
| --- | --- | --- | --- |
| 1 | 160 | 105 | 25 |
| 2 | 180 | 110 | 20 |
| 3 | 180 | 130 | 10 |
| 4 | 0 | 0 | 5 |

After heat processing, the turkey products show an excellent golden brown smoke color. The products are then further chilled in a 28° F. cooler and vacuum packed.

EXAMPLE 3

Six pounds of maillose powder (a caramel coloring powder available from Red Arrow Co.) is blended with four pounds of gelatin powder in a spice blender for five minutes to assure uniformity. The maillose powder has the following properties:

Moisture: <5.0%
Bulk Density: 0.55 g/cc
pH: 3 to 3.5
Color: light to medium yellow The blended powder is coated on bare, cooked and chilled turkey breast as described in Example 1. The coated turkey breasts are heat processed as described in Example 2. After heat processing, the turkey breasts exhibit an excellent golden-brown bake color. The turkey breast are then further chilled in a 28° F. cooler and vacuum packed.

While the invention has been described in connection with a preferred embodiment, it will be understood that it is not intended to limit the invention thereto, but it is intended to cover all modifications and alternative constructions falling within the spirit and scope of the invention as expressed in the appended claims.

I claim:
1. A method for applying a powder blend to a whole meat muscle product comprising the steps of:
   placing a cooked, whole meat muscle product on an electrically grounded support in a coating chamber to expose a surface of the whole meat muscle product to be coated, introducing a powder blend having a particle size of less than about 70 microns into the coating chamber, the powder blend containing a food grade powder, that is at least partially cold water-soluble, and a powdered, moisture-absorbent agent, and applying an electrostatic charge to the powder blend, thereby causing the powder blend to be attracted to and form a coating on the exposed surface to the whole meat muscle product.

2. The method in accordance with claim 1 wherein the whole meat muscle product is selected from the group consisting of turkey, chicken, or ham whole muscle products.

3. The method in accordance with claim 2 wherein the food grade powder is a flavoring or coloring powder.

4. The method in accordance with claim 3 wherein the food grade powder is a smoke powder or a caramel color powder.

5. The method in accordance with claim 4 wherein the food grade powder is a smoke powder.

6. The method in accordance with claim 4 wherein the moisture absorption agent is gelatin, carrageenan, or starch.

7. The method in accordance with claim 6 wherein the moisture absorption agent is gelatin.

8. The method in accordance with claim 4 wherein the ratio of food grade powder to moisture absorption agent is from about 1:20 to about 20:1, based on the weight of the powder blend.

9. The method in accordance with claim 6 wherein the ratio of food grade powder to moisture absorption agent is from about 1:20 to about 20:1, based on the weight of the powder blend.

10. The method in accordance with claim 4 wherein the ratio of food grade powder to moisture absorption agent is from about 2:1 to about 20:1, based on the weight of the powder blend.

11. The method in accordance with claim 6 wherein the ratio of food grade powder to moisture absorption agent is from about 2:1 to about 20:1, based on the weight of the powder blend.

12. The method in accordance with claim 4 wherein the coating weighs from about 0.05 to about 2.0 weight percent, based on the weight of the coated whole meat muscle product.

13. The method in accordance with claim 6 wherein the coating weigh from about 0.05 to about 2.0 weight percent, based on the weight of the coated whole meat muscle product.

14. The method in accordance with claim 4 wherein the coating weighs from about 0.1 to about 0.2 weight percent, based on the weight of the coated whole meat muscle product.

15. The method in accordance with claim 6 wherein the coating weighs from about 0.1 to about 0.2 weight percent, based on the weight of the coated whole meat muscle product.

16. The method in accordance with claim 6 further comprising treating the whole meat muscle product with water or a pickling solution to cause the exposed surface to be wet prior to placing the whole meat muscle product in the coating chamber.

17. The method in accordance with claim 16 wherein sufficient moisture absorption agent is attracted to dry the exposed surface of the whole meat muscle product.

18. The method in accordance with claim 4 further comprising curing the thus coated whole meat muscle product to develop flavor, color or both.

19. The method in accordance with claim 1, wherein the powder blend has a particle size of from about 1 to about 40 microns.

20. A method for applying a powder blend to a whole meat muscle product comprising the steps of:

treating a turkey, chicken, or ham whole meat muscle product with water or a pickling solution;

cooking the treated whole meat muscle product to an internal temperature of at least about 150° F., chilling the cooked whole meat muscle product to an internal product temperature of at least about 40° F., placing the chilled whole meat muscle product on an electrically grounded support in a coating chamber to expose a wet surface of the whole meat muscle product to be coated, introducing a powder blend of a smoke powder or a caramel color powder and a powdered moisture absorption agent into the coating chamber, the particle size of the blend being less than about 70 microns and the ratio of the smoke powder or the caramel color powder to the moisture absorption agent being from about 2 to 1 to about 20 to 1, based on the weight of the powder blend, applying an electrostatic charge to the powder blend, thereby causing the powder blend to be attracted to and form a coating weighing from about 0.05 to about 2.0 weight percent, based on the weight of the coated whole meat muscle product, on the exposed surface of the whole meat muscle product, and then curing the thus coated whole meat muscle product to develop a flavor, color or both.

21. The method in accordance with claim 20, wherein the powder blend has a particle size of from about 1 to about 40 microns.

* * * * *